United States Patent [19]

Deaver et al.

[11] Patent Number: 5,737,380

[45] Date of Patent: Apr. 7, 1998

[54] CORE SPRAY LINE ASSEMBLY

[75] Inventors: Gerald Alan Deaver; Barry Hal Koepke; Frank Ortega, all of San Jose, Calif.

[73] Assignee: General Electric Company, Schenectady, N.Y.

[21] Appl. No.: 681,803

[22] Filed: Jul. 29, 1996

[51] Int. Cl.[6] ................................................. G21C 15/00
[52] U.S. Cl. ........................... 376/352; 376/282; 376/286
[58] Field of Search ................................ 376/277, 282, 376/286, 352

[56] References Cited

U.S. PATENT DOCUMENTS 4,238,291  12/1980  Neuenfeldt et al. ................ 376/285
4,859,403   8/1989  Dixon et al. ........................ 376/352
5,353,319  10/1994  Challberg ........................... 376/286

*Primary Examiner*—Daniel D. Wasil
*Attorney, Agent, or Firm*—Armstrong, Teasdale, Schlafly & Davis

[57] ABSTRACT

A core spray line assembly for a nuclear reactor is described. In one embodiment, the core spray line assembly includes first and second core spray lines. Each of the core spray lines is substantially located within the reactor pressure vessel and has first and second ends connected to the shroud. The first and second core spray lines include an adjustable core spray header and first and second articulating vertical pipe connector. The adjustable core spray header and articulating pipe connectors facilitate fast and easy replacement of existing core spray lines with the present core spray lines.

20 Claims, 2 Drawing Sheets

CORE SPRAY LINE ASSEMBLY

FIELD OF THE INVENTION

This invention relates generally to nuclear reactors and, more particularly, to a replacement core spray line for such reactors.

BACKGROUND OF THE INVENTION

Nuclear reactors generally include a core spray line for delivering water to the reactor core from a source external the reactor pressure vessel. A known core spray line includes steel pipes and such pipes are believed to be susceptible to intergranular stress corrosion cracking (IGSCC) due to the reactor oxidizing environment. The core spray line may be particularly susceptible to IGSCC since stagnant water typically is present in the pipes.

If cracks are found in the core spray line pipes, it may be more beneficial to replace the entire core spray line rather than attempt to repair each pipe at the crack locations by welding. Installing a replacement core spray line into the reactor, however, may be extremely difficult. For example, when the original core spray line is installed into the reactor, the pipes typically are flexed in order to avoid other reactor components. Such flexing requires that the pipes be cold worked, which increases the susceptibility of the pipes to IGSCC. It would be desirable to avoid such flexing of the replacement pipe.

In addition, the replacement core spray line has to meet the dimensional requirements of the existing reactor components. Such requirements may have limited tolerances, which increases the difficulty of installing the replacement core spray line. Also, it would be desirable to complete the installation of the replacement core spray line as quickly as possible, without distorting the reactor components, to reduce the reactor shutdown time and worker exposure.

SUMMARY OF THE INVENTION

These and other objects are attained by a core spray line apparatus for a nuclear reactor which, in one embodiment, includes connections which facilitate fast and easy replacement of existing core spray lines. More specifically, and in one embodiment, the apparatus includes first and second core spray lines configured to be substantially located within a reactor pressure vessel. Each core spray line has first and second ends configured to be connected to the upper shroud. The first and second core spray lines each further include an adjustable core spray header, and first and second articulating vertical pipe connectors. The adjustable core spray header and articulating connectors provide the flexibility necessary to enable fast and easy replacement of existing core spray lines.

In one specific embodiment, each core spray line further includes first and second horizontal pipes, a first elbow connector connected to a first end of the first horizontal pipe, and a second elbow connector connected to a second end of the second horizontal pipe. The apparatus also includes first and second vertical pipes. Each vertical pipe has a first end and a second end. The first ends of the first and second vertical pipes are connected to the first and second elbow connectors, respectively.

The first articulating pipe connector is connected to a second end of the first vertical pipe, and the second articulating pipe connector is connected to the second end of the second vertical pipe. First and second shroud attachment pipes are connected at first ends to the first and second articulating vertical pipe connectors, respectively.

With respect to the core spray header, the header includes a T-connector having a substantially horizontal member and a thermal sleeve attachment member substantially perpendicular, and coupled, to the substantially horizontal member. The first and second ends of the horizontal member have substantially conical surfaces, and the ends of the first and second horizontal pipes which mate with the horizontal pipe member have spherical seats therein for receiving the conical surfaces at the first and second ends of the horizontal member.

To connect the core spray header to the horizontal pipes, a first bracket is located at the second end of the first horizontal pipe and a second bracket is located at the first end of the second horizontal pipe. The first and second brackets have a plurality of openings therein. A plurality of connection bolts engage the first and second horizontal pipes to the core spray header. Specifically, each connection bolt has a first threaded end and a second threaded end. The first threaded end of each bolt at least partially extends through one opening in the first bracket and the second threaded end of each bolt at least partially extends through one opening in the second bracket. Respective nuts are threadedly engaged to the first and second threaded ends of the bolts and are tightened against one of the respective brackets.

With respect to the first and second articulating vertical pipe connectors, each such connector includes a substantially cylindrical connector member having a main body portion and first and second ends. The first and second ends each have a spherical surface and a piston ring groove therein. First and second piston rings are positioned in the respective piston ring grooves. The second ends of the vertical pipes each have an end member having a larger inner diameter than an inner diameter of another portion of the vertical pipe. The larger inner diameter of the vertical pipe end member is slightly larger than an outer diameter of the spherical surfaces of the first end of the articulating pipe connector. Therefore, the vertical pipe end member slides over the spherical surface of the connector first end and a seal is formed therebetween by the piston ring.

Similarly, the first ends of the shroud attachment pipes each have an end member having a larger inner diameter than an inner diameter of another portion of the attachment pipe. The larger inner diameter of the attachment pipe end member is slightly larger than an outer diameter of the spherical surface of the second end of the articulating pipe connector second end. Therefore, the end member of the attachment pipe slides over the spherical surface of the connector and a seal is formed therebetween by the piston ring.

A plurality of support brackets are engaged to the horizontal pipes to provide support for the core spray line. In one embodiment, each bracket includes a pipe restraining clamp having first and second ends, and first and second bolt openings are located at the first and second clamp ends, respectively. The horizontal pipe extends between the reactor pressure vessel and each pipe restraining clamp, and first and second bolts extend through the first and second bolt openings, respectively, and are engaged to the reactor pressure vessel.

The replacement core spray line apparatus described above provides the important advantage of enabling fast and easy replacement of existing core spray lines. In addition, such apparatus does not require that the piping be flexed during installation and the pipes do not have to be cold worked. Therefore, the replacement pipes are believed to be less susceptible to IGSCC as compared to existing core spray lines. Further, the adjustable core spray header and the articulating vertical pipe connector enable the replacement core spray line apparatus to satisfy limited tolerance requirements of many different reactor configurations and eliminates a need to perform invessel measurements, which simplifies installation. Such fast and easy installation facilitates reducing both the reactor shutdown time and worker exposure.

DETAILED DESCRIPTION OF THE DRAWINGS

Figure 1:
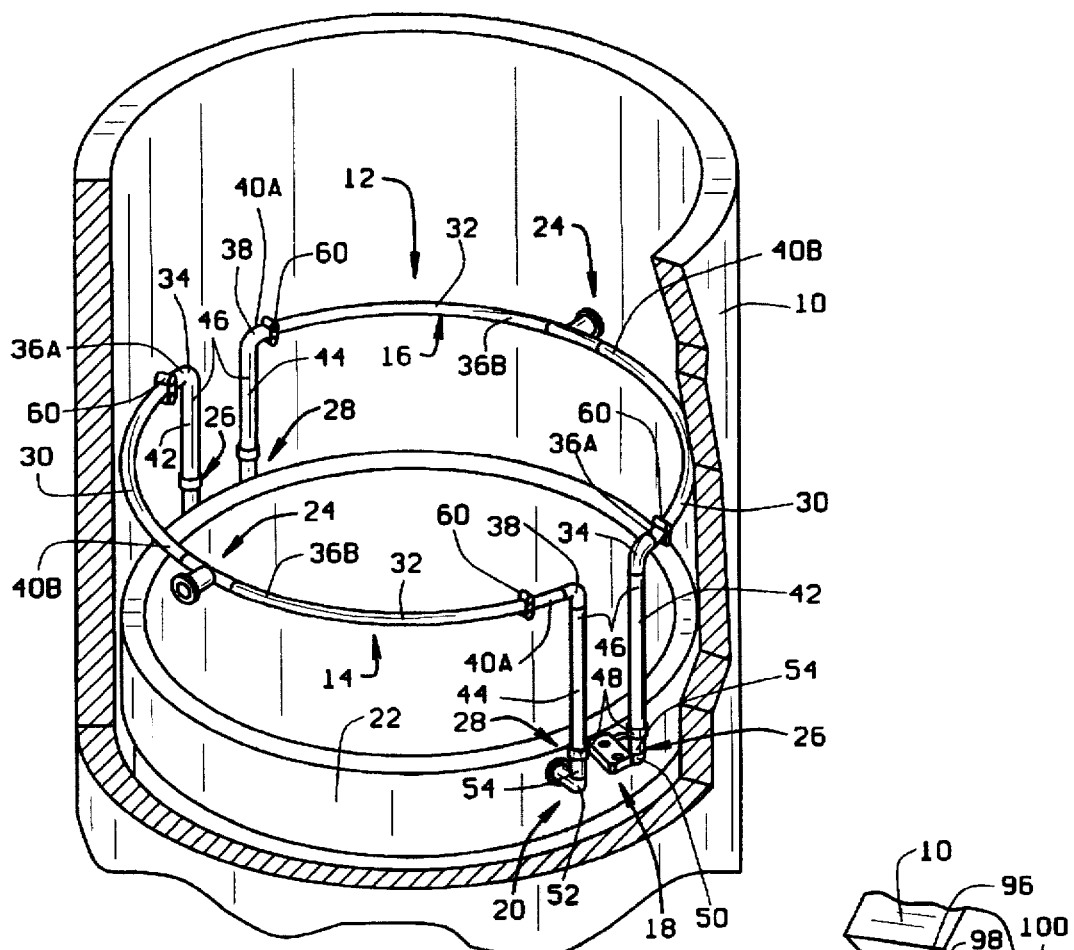
FIG. 1 is a perspective view, with parts cut away, of a reactor pressure vessel and core spray lines in accordance with one embodiment of the present invention.

FIG. 1 is a perspective view, with parts cut away, of a reactor pressure vessel 10 and a replacement core spray line apparatus 12 in accordance with one embodiment of the present invention. More specifically, apparatus 12 includes first and second core spray lines 14 and 16 configured to be substantially located within reactor pressure vessel 10. Each core spray line 14 and 16 has first and second ends 18 and 20 connected to a shroud head 22. First and second core spray lines 14 and 16 each further include an adjustable core spray header 24 and first and second articulating vertical pipe connectors 26 and 28. Adjustable core spray header 24 and articulating connectors 26 and 28 provide the flexibility necessary to enable fast and easy replacement of existing core spray lines.

Each core spray line 14 and 16 further includes first and second horizontal pipes 30 and 32, a first elbow connector 34 connected to a first end 36A of first horizontal pipe 30, and a second elbow connector 38 connected to a second end 40A of second horizontal pipe 32. First end 36B of second horizontal pipe 32 and second end 40B of first horizontal pipe 30 are coupled to core spray header 24. Each line 14 and 16 also includes first and second vertical pipes 42 and 44. Each vertical pipe 42 and 44 has a first end 46 and a second end 48. First ends 46 of first and second vertical pipes 42 and 44 are connected to first and second elbow connectors 34 and 38, respectively. First articulating pipe connector 26 is connected to second end 48 of first vertical pipe 42, and second articulating pipe connector 28 is connected to second end 48 of second vertical pipe 44. First and second shroud attachment pipes 50 and 52 are connected at first ends 54 to first and second articulating vertical pipe connectors 26 and 28, respectively. Each shroud attachment pipe 50 and 52 also has a second end 56, and a shroud attachment flange 58 is located at each second end 56 of shroud attachment pipes 50 and 52. Flange 58 is engaged to core shroud 22. A plurality of brackets 60 provide support for pipes 30 and 32.

Figure 2:
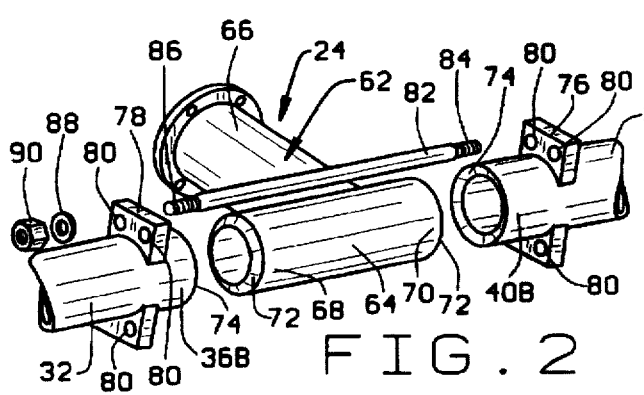
FIG. 2 is an exploded view of an adjustable core spray header of one core spray line shown in FIG. 1.

FIG. 2 is an exploded view of an adjustable core spray header 24 of first core spray line 14 shown in FIG. 1. Header 24 includes a T-connector 62 having a substantially horizontal member 64 and a thermal sleeve attachment member 66 substantially perpendicular, and coupled, to substantially horizontal member 64. First and second ends 68 and 70 of horizontal member 64 have substantially conical surfaces 72, and second end 40B of first horizontal pipe 30 and first end 36B of second horizontal pipe 32 have spherical seats 74 therein for receiving conical surfaces 72 at first and second ends 68 and 70 of horizontal member 64.

A first bracket 76 is located at second end 40 of first horizontal pipe 30 and a second bracket 78 is located at first end 36 of second horizontal pipe 32. First and second brackets 76 and 78 have a plurality of openings 80 therein. A plurality of connection bolts 82 (only one bolt 82 is shown in FIG. 2) are utilized to engage first and second horizontal pipes 30 and 32 to core spray header 24. Specifically, each connection bolt 82 has a first threaded end 84 and a second threaded end 86. First threaded end 84 of each bolt 82 at least partially extends through one opening 80 in first bracket 76 and second threaded end 86 of each bolt 82 at least partially extends through one opening 80 in second bracket 78. Respective spherical washers 88 are positioned on ends 84 and 86, and respective nuts 90 threadedly engage to first and second threaded ends 84 and 86 and are tightened against one of respective brackets 76 and 78.

Above described core spray header 24 is adjustable in that the positioning of horizontal pipes 30 and 32 relative to T-connector 62 can be adjusted. Such adjustment is facilitated by use of spherical seats 74 and conical surfaces 72, and connection bolts 82.

Figure 3:
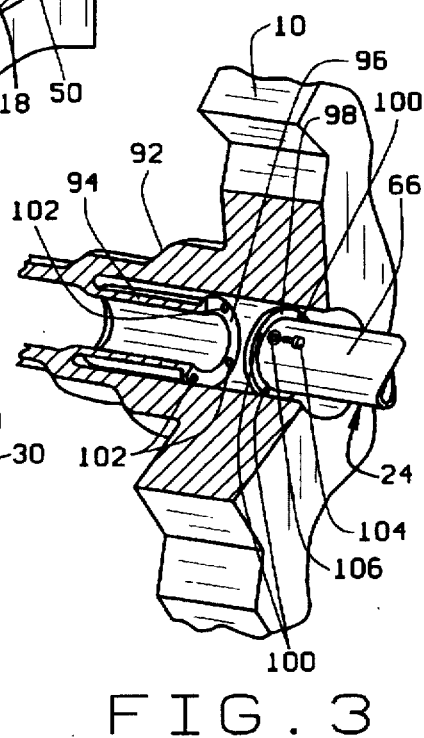
FIG. 3 is partial cross section view of the thermal sleeve attachment of the core spray header shown in FIG. 2.

FIG. 3 is partial cross section view of thermal sleeve attachment member 66 of core spray header 24 shown in FIG. 2, with relation to a nozzle 92 in reactor pressure vessel 10. As shown in FIG. 3, nozzle 92 includes a thermal sleeve 94 having a flange 96. Thermal sleeve attachment member 66 also includes a flange 98 having openings 100 which align with openings 102 in flange 96. Bolts 104 and washers 106 are utilized to engage flanges 96 and 98. Specifically, respective bolts 104 extend through aligned openings 100 and 102 in flanges 96 and 98.

Figure 4:
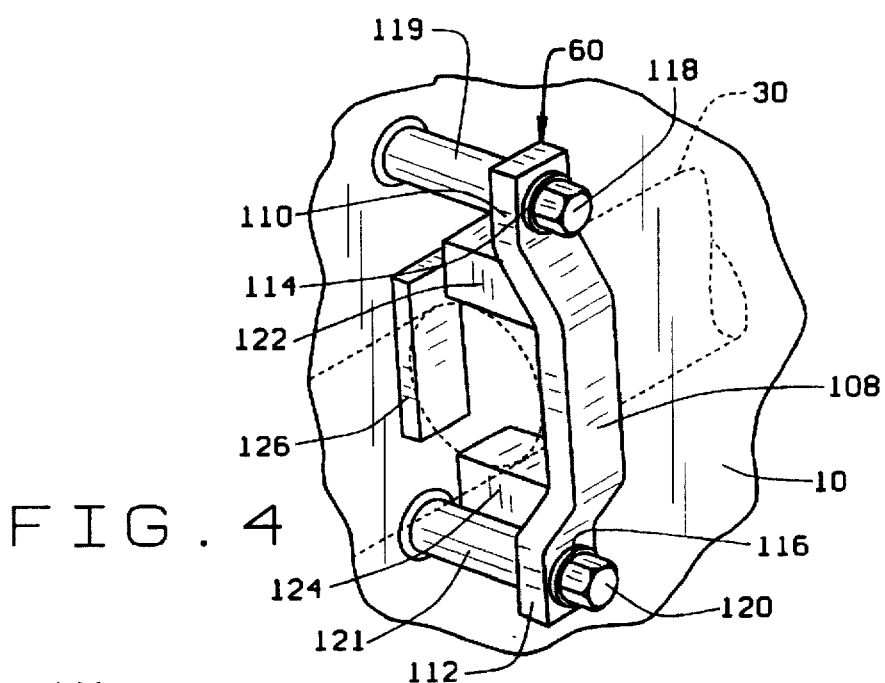
FIG. 4 is a perspective view of a bracket of the core spray line shown in FIG. 1.

FIG. 4 is a perspective view of one bracket 60 of the core spray line shown in FIG. 1. Brackets 60 are engaged to horizontal pipes 30 (and 32) to provide support for respective core spray lines 14 and 16. In the one embodiment shown in FIG. 4, bracket 60 includes a pipe restraining clamp 108 having first and second ends 110 and 112, and first and second bolt openings 114 and 116 are located at first and second clamp ends 110 and 112, respectively. Horizontal pipe 30 extends between reactor pressure vessel 10 and each pipe restraining clamp 108, and first and second bolts 118 and 120 extend through first and second bolt openings 114 and 116, respectively, and are engaged to studs 119 and 121 which are attached to reactor pressure vessel 10. Vertical restraints 122 and 124 are welded to clamp 108 and a pad 126 is welded to vessel 10. Clamp 108, restraints 122 and 124, and pad 126 limit movement of pipe 30.

Figure 5:
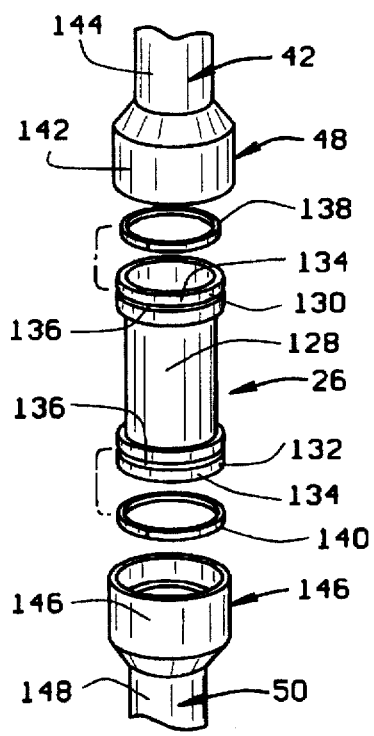
FIG. 5 is an exploded view of the articulating vertical pipe connector of the core spray line shown in FIG. 1.

FIG. 5 is an exploded view of articulating vertical pipe connector 26 shown in FIG. 1. Connector 28 is identical to connector 26. Connector 26 includes a substantially cylindrical connector member 128 having first and second ends 130 and 132. First and second ends 130 and 132 each have a spherical surface 134 and a piston ring groove 136 therein. First and second piston rings 138 and 140 are positioned in respective piston ring grooves 136. Second end 48 of vertical pipe 42 has an end member 142 having a larger inner diameter than an inner diameter of another portion 144 of vertical pipe 42. Larger inner diameter of end member 142 is slightly larger than an outer diameter of spherical surface 134 of first end 130 of member 128. Therefore, end member 142 slides over spherical surface 134 of connector 26 and a seal is formed therebetween by piston ring 138. Vertical pipe 42 is identical to vertical pipe 44.

First end 146 of shroud attachment pipe 50 has an end member 146 having a larger inner diameter than an inner diameter of another portion 148 of attachment pipe 50. Larger inner diameter of end member 146 is slightly larger than an outer diameter of spherical surface 134 of second end 132 of articulating pipe connector 26. Therefore, end member 146 of attachment pipe 50 slides over spherical surface 134 of connector 26 and a seal is formed therebetween by piston ring 140.

Figure 6:
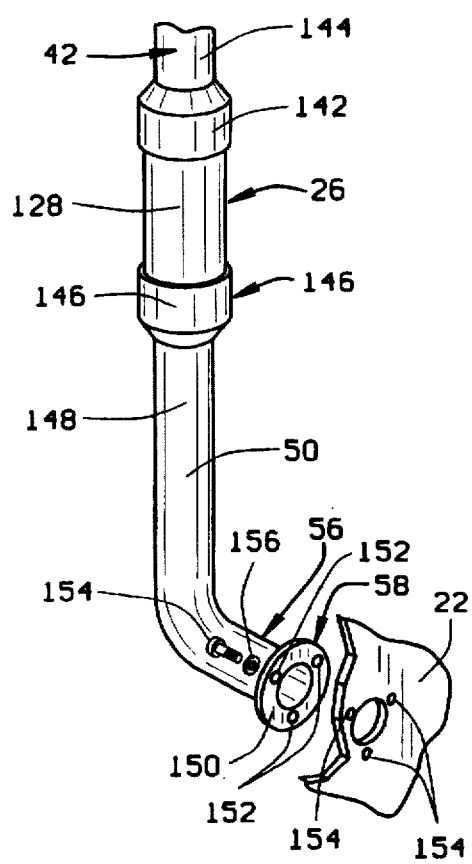
FIG. 6 is a perspective view of a shroud attachment pipe of the core spray line shown in FIG. 1.

As shown in FIG. 6, shroud attachment pipe 50 also includes a flange 150 having a plurality of openings 152 therein. Openings 152 align with respective openings 154 in shroud 22, and bolts 154 and washers 156 are utilized to engage flange 150 to shroud head 22.

Articulating pipe connector 26 provides a number of important advantages. For example, even though connector 26 is a link for pipes 42 and 50, no measurements of pipes 42 and 50 are required in order to make the link. By eliminating a need for such measurements, the link can be formed more quickly and easily. In addition, since pipes 42 and 50 can move relative to connector, thermal expansion stresses are eliminated.

When replacing an existing core spray line with core spray line apparatus 12 described above, a plug (not shown) can be installed in nozzle 92 (FIG. 3) so that vessel 10 remains flooded during replacement. With the plug in place, nozzle 92 can be drained to allow replacement of the nozzle safe end from the drywell side. Replacement activities inside and outside vessel 10 can be performed in parallel. The invessel work can be performed by underwater divers in order to reduce personnel radiation exposure.

The replacement core spray line apparatus described above provides the important advantage of enabling fast and easy replacement of existing core spray lines. In addition, such apparatus does not require that the piping be flexed during installation and the pipes do not have to be cold worked. Therefore, the replacement pipes are believed to be less susceptible to IGSCC as compared to existing core spray lines. Further, the adjustable core spray header and the articulating vertical pipe connector enable the replacement core spray line apparatus to satisfy limited tolerance requirements of many different reactor configurations and eliminates a need to perform invessel measurements, which simplifies installation. Such fast and easy installation facilitates reducing both the reactor shutdown time and worker exposure.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A core spray line for a nuclear reactor, the reactor including a reactor pressure vessel and a shroud having a shroud head, said core spray line comprising:

first and second horizontal pipes, each of said horizontal pipes having a first end and a second end;

a core spray header for coupling said second end of said first horizontal pipe to said first end of said second horizontal pipe;

a first elbow connector connected to said first end of said first horizontal pipe;

a second elbow connector connected to said second end of said second horizontal pipe;

first and second vertical pipes, each of said vertical pipes having a first end and a second end, said first ends of said first and second vertical pipes connected to said first and second elbow connectors, respectively;

first and second articulating vertical pipe connectors, said first articulating pipe connector connected to said second end of said first vertical pipe, said second articulating pipe connector connected to said second end of said second vertical pipe; and first and second shroud attachment pipes connected at first ends to said first and second articulating vertical pipe connectors, respectively.

2. A core spray line in accordance with claim 1 wherein said core spray header comprises a T-connector, said T-connector having a substantially horizontal member and a thermal sleeve attachment member substantially perpendicular, and coupled, to said substantially horizontal member.

3. A core spray line in accordance with claim 2 wherein said substantially horizontal member has first and second ends, said first and second ends having substantially conical surfaces.

4. A core spray line in accordance with claim 3 wherein said second end of said first horizontal pipe and said first end of said second horizontal pipe have spherical seats therein for receiving said conical surfaces at said first and second ends of said horizontal member.

5. A core spray line in accordance with claim 2 further comprising a first bracket at said second end of said first horizontal pipe and a second bracket at said first end of said second horizontal pipe, said first and second brackets having a plurality of openings therein.

6. A core spray line in accordance with claim 5 further comprising a plurality of connection bolts, each of said connection bolts having a first threaded end and a second threaded end, said first threaded end of each of said bolts at least partially extending through one of said openings in said first bracket and said second threaded end of each of said bolts at least partially extending through one of said openings in said second bracket, respective nuts threadedly engaged to said first and second threaded ends of said bolts and tightened against one of said respective brackets.

7. A core spray line in accordance with claim 2 wherein a thermal sleeve flange is at an end of said thermal sleeve attachment member.

8. A core spray line in accordance with claim 1 wherein said first and second articulating vertical pipe connectors each comprise a substantially cylindrical connector member having first and second ends, said first and second ends each having a spherical surface and a piston ring groove therein, and first and second piston rings positioned in said respective piston ring grooves.

9. A core spray line in accordance with claim 8 wherein said second ends of said vertical pipes each have an end member having a larger inner diameter than an inner diameter of another portion of said vertical pipe, said larger inner diameter of said end member being slightly larger than an outer diameter of said spherical surface of said first end of said articulating pipe connector.

10. A core spray line in accordance with claim 8 wherein said first ends of said shroud attachment pipes each have an end member having a larger inner diameter than an inner diameter of another portion of said attachment pipe, said larger inner diameter of said end member being slightly larger than an outer diameter of said spherical surface of said second end of said articulating pipe connector.

11. A core spray line in accordance with claim 10 wherein each of said shroud attachment pipes have a second end, a shroud attachment flange located at each of said second ends of said shroud attachment pipes.

12. A core spray line in accordance with claim 1 further comprising a first bracket engaged to said first horizontal pipe, said first bracket comprising a pipe restraining clamp having first and second ends, first and second bolt openings located at said first and second clamp ends, respectively, and first and second bolts, said first horizontal pipe extending between the reactor pressure vessel and said pipe restraining clamp, said first and second bolts extending through said first and second bit openings, respectively, and engaged to the reactor pressure vessel.

13. Core spray apparatus for a nuclear reactor, the reactor including a reactor pressure vessel and a shroud having a shroud head, said core spray apparatus comprising:

first and second core spray lines, each of said core spray lines substantially located within the reactor pressure vessel and having first and second ends connected to the shroud; and said first and second core spray lines each comprising an adjustable core spray header and first and second articulating vertical pipe connector.

14. Core spray apparatus in accordance with claim 13 wherein said core spray header comprises a T-connector, said T-connector having a substantially horizontal member and a thermal sleeve attachment member substantially perpendicular, and coupled, to said substantially horizontal member, said substantially horizontal member having first and second ends, said first and second ends having substantially conical surfaces, said second end of said first horizontal pipe and said first end of said second horizontal pipe having spherical seats therein for receiving said conical surfaces at said first and second ends of said horizontal member.

15. Core spray apparatus in accordance with claim 14 further comprising a first bracket at said second end of said first horizontal pipe and a second bracket at said first end of said second horizontal pipe, said first and second brackets having a plurality of openings therein, a plurality of connection bolts, each of said connection bolts having a first threaded end and a second threaded end, said first threaded end of each of said bolts at least partially extending through one of said openings in said first bracket and said second threaded end of each of said bolts at least partially extending through one of said openings in said second bracket, respective nuts threadedly engaged to said first and second threaded ends of said bolts and tightened against one of said respective brackets.

16. Core spray apparatus in accordance with claim 13 wherein each of said first and second core spray lines further comprises:

first and second horizontal pipes, each of said horizontal pipes having a first end and a second end;

said core spray header coupling said second end of said first horizontal pipe to said first end of said second horizontal pipe;

a first elbow connector connected to said first end of said first horizontal pipe;

a second elbow connector connected to said second end of said second horizontal pipe;

first and second vertical pipes, each of said vertical pipes having a first end and a second end, said first ends of said first and second vertical pipes connected to said first and second elbow connectors, respectively;

said first articulating pipe connector connected to said second end of said first vertical pipe, said second articulating pipe connector connected to said second end of said second vertical pipe; and first and second shroud attachment pipes connected at first ends to said first and second articulating vertical pipe connectors, respectively.

17. Core spray apparatus in accordance with claim 16 wherein said first and second articulating vertical pipe connectors each comprise a substantially cylindrical connector member having first and second ends, said first and second ends each having a spherical surface and a piston ring groove therein, and first and second piston rings positioned in said respective piston ring grooves.

18. Core spray apparatus in accordance with claim 17 wherein said second ends of said vertical pipes each have an end member having a larger inner diameter than an inner diameter of another portion of said vertical pipe, said larger inner diameter of said end member being slightly larger than an outer diameter of said spherical surface of said first end of said articulating pipe connector.

19. Core spray apparatus in accordance with claim 17 wherein said first ends of said shroud attachment pipes each have an end member having a larger inner diameter than an inner diameter of another portion of said attachment pipe, said larger inner diameter of said end member being slightly larger than an outer diameter of said spherical surface of said second end of said articulating pipe connector.

20. Core spray apparatus in accordance with claim 16 further comprising a first bracket engaged to said first horizontal pipe, said first bracket comprising a pipe restraining clamp having first and second ends, first and second bolt openings located at said first and second clamp ends, respectively, and first and second bolts, said first horizontal pipe extending between the reactor pressure vessel and said pipe restraining clamp, said first and second bolts extending through said first and second bolt openings, respectively, and engaged to studs which extend from the reactor pressure vessel.

* * * * *